United States Patent [19]

Szczepanek

[11] Patent Number: 5,517,638

[45] Date of Patent: May 14, 1996

[54] DYNAMIC CLOCK SWITCHING CIRCUITRY AND METHOD

[75] Inventor: Andre Szczepanek, Brickhill, United Kingdom

[73] Assignee: Texas Instruments Incorporated, Dallas, Tex.

[21] Appl. No.: 61,602

[22] Filed: May 13, 1993

[51] Int. Cl.$^6$ .............................. H04L 7/00; H03K 5/135
[52] U.S. Cl. .................. 395/550; 375/357; 375/356; 327/141; 327/156; 327/281
[58] Field of Search ..................... 375/108, 107, 375/356, 357; 307/603; 364/DIG. I, DIG. II, 900; 395/550; 328/73; 327/141, 156, 281

[56] References Cited

U.S. PATENT DOCUMENTS

| | | | |
|---|---|---|---|
| 4,398,155 | 8/1983 | Atwell, Jr. et al. | 328/73 |
| 4,511,993 | 4/1985 | Bromme et al. | 364/900 |
| 4,651,103 | 3/1987 | Grimes | 328/72 |
| 4,696,019 | 9/1987 | Tulpule et al. | 375/107 |
| 4,823,262 | 4/1989 | Calle | 364/200 |
| 4,841,523 | 6/1989 | Roffinella et al. | 370/89 |
| 4,866,703 | 9/1989 | Black et al. | 370/60 |
| 4,870,299 | 9/1989 | Chen | 307/269 |
| 5,241,543 | 8/1993 | Amada et al. | 370/100.1 |
| 5,274,678 | 12/1993 | Ferolito et al. | 375/108 |
| 5,287,025 | 2/1994 | Nishimichi | 307/603 |

*Primary Examiner*—Kevin A. Kriess
*Assistant Examiner*—Majid A. Banankhah
*Attorney, Agent, or Firm*—Robert D. Marshall, Jr.; James C. Kesterson; Richard L. Donaldson

[57] ABSTRACT

Circuitry for switching between a first and second clock signal is provided having a first local clock circuit 202, a first synchronizing circuit 200 connected to said first clock circuit 202, a first delay circuit 206a–d connected to said first synchronizing circuit 200 and said first clock circuit 202, a second delay circuit 206e, 210, connected to said first delay circuit 206a–d and said first clock circuit 202, a first logic circuit 220 connected to said first 206a–d and second 206e, 210 delay circuits and said first synchronizing circuit 200, a second local clock circuit 102, a second synchronizing circuit 100 connected to said second clock circuit 102, a third delay circuit 106, 108, 110, connected to said second synchronizing circuit 100 and said second clock circuit 102, a second logic circuit 104 connected to said second clock circuit 102 and a portion of said third delay circuit 106, 108, 110, a third logic circuit 120 connected to said third delay circuit 106, 108, 110, and said second clock circuit 102, and a multiplexer 16 connected to said first 220 and third 120 logic circuits. The method of the present invention switches between a first 19 and second 21 clock signal by detecting a change in a signal 23 indicative of need to switch from said first clock signal to said second clock signal (or vice vers. a) 302, generating at least one local control signal 70, 72 responsive to said detection 304, deselecting a first in use clock signal 306 responsive to a first local control signal, selecting the second clock signal 308 for use responsive to a second local control signal, and switching to the non-used (second) clock signal after a preselected delay 310 based upon said second clock signal and said detection of said change in said signal.

8 Claims, 3 Drawing Sheets

DYNAMIC CLOCK SWITCHING CIRCUITRY AND METHOD

TECHNICAL FIELD OF THE INVENTION

The present invention relates generally to clock switching circuitry and more particularly to dynamic clock switching circuitry and method.

BACKGROUND OF THE INVENTION

Various types of circuitry are currently employed to interface with local area computer networks. Depending upon the type of local area network employed peripheral devices are selected that appropriately interface with the network employed. Currently, two major types of network are token ring and Ethernet.

These peripheral devices employ very complex circuitry. When this circuitry is turned "on" (or powered up), it is conventional to perform some initialization and self-testing. During this initialization and/or self-testing the circuitry employs an internal clock to provide any necessary clock signals. However, at one or more points in time, after start-up, the circuitry must synchronize itself with an external clock. Depending upon the type of network, synchronization with the external clock may also be required as a part of normal operations.

A computer network generally employs a clock to synchronize communications between the various peripheral devices attached to it. Currently, a token ring network provides a clock signal to the network as long as the network is operating. An Ethernet network, on the other hand, only provides a clock signal when data is being transmitted over the network. Thus, the peripheral devices use a control signal, generally called "carrier sense", to determine whether there is information available from the network, such as its clock signal. For an Ethernet network, the carrier sense signal and network clock signal may start with or slightly precede the start of a packet of data and may terminate with or slightly after the end of the data packet.

Thus, there is a need for clock control circuitry that enables the circuitry of the peripheral device to dynamically switch between an internal clock and an external clock.

These and other disadvantages of the prior art are overcome by the present invention, however, and improved dynamic clock switching circuitry and method are provided.

SUMMARY OF THE INVENTION

In a preferred embodiment of the present invention, dynamic clock switching circuitry and method are provided. The preferred dynamic clock switching circuitry employs a first local clock circuit, a first synchronizing circuit connected to said first local clock circuit, a first delay circuit connected to said first synchronizing circuit and said first local clock circuit, a second delay circuit connected to said first delay circuit and said first local clock circuit, a first logic circuit connected to said first and second delay circuits and said synchronizing circuit, a second local clock circuit, a second synchronizing circuit connected to said second local clock circuit, a third delay circuit connected to said second synchronizing circuit and said second clock circuit, a fourth delay circuit connected to said third delay circuit and said second clock circuit, a second logic circuit connected to said second clock circuit and a portion of said fourth delay circuit, a third logic circuit connected to said third and fourth delay circuits and said second logic circuit, and a multiplexer connected to said first and third logic circuit.

The method of the present invention switches between a first and second clock signal by detecting a change in a control signal indicative of a need to switch from a first clock signal to a second clock signal (or vice versa), generating at least one local control signal responsive to this detection, deselecting a first clock signal in use responsive to a first local control signal, selecting the second clock signal for use responsive to a second local control signal, and switching to the non-used (second) clock signal after a preselected delay based upon the second clock signal and the detection of the change in the control signal.

It is a feature of the present invention to provide dynamic clock switching circuitry and method.

It is a feature of the present invention to provide dynamic clock switching circuitry that accommodates any type of carrier sense system.

If is a feature of the present invention to provide dynamic clock switching circuitry for use in a device that interfaces with a computer local area network.

These and other features and advantages of the present invention will become apparent from the following detailed description, wherein reference is made to the figures in the accompanying drawings.

BRIEF DESCRIPTION OF THE DRAWINGS

A more complete understanding of the present invention may be derived by referring to the detailed description and claims when considered in conjunction with the accompanying drawings in which like reference numbers indicate like features throughout the drawings, and wherein:

DETAILED DESCRIPTION

Figure 1:
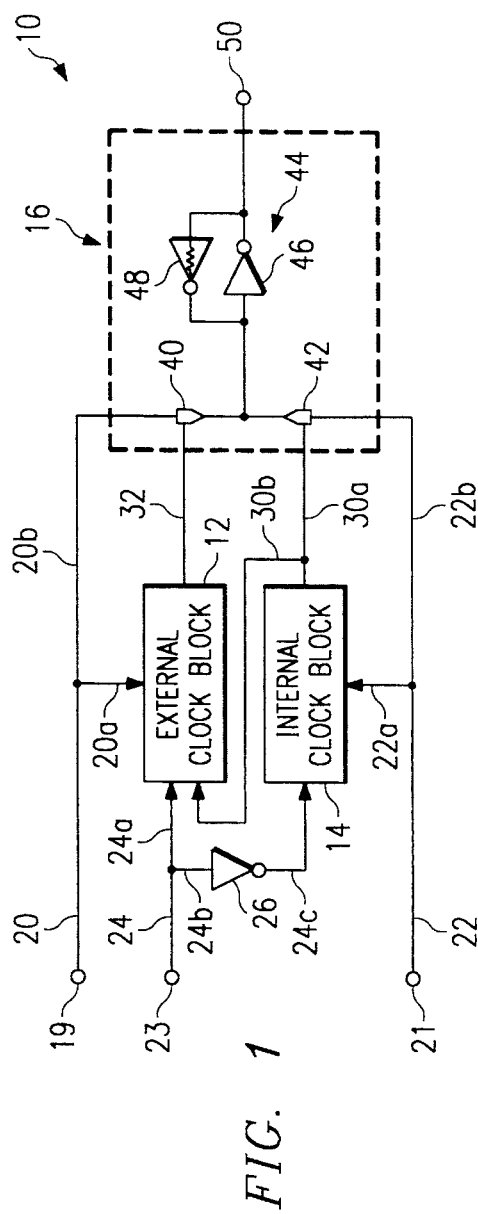
FIG. 1 depicts a simplified block diagram of the dynamic clock switching circuitry of the present invention.

Referring now to FIG. 1, there may be seen a simplified block diagram of the dynamic clock switching circuit 10 of the present invention. More particularly, it may be seen that the dynamic clock switching circuit 10 of the present invention consists of three major components. These three major components are an external clock circuitry block 12, an internal clock circuitry block 14, and a multiplexer 16 (outlined by a dashed line).

In addition, it may be seen that there is an external clock signal 19 which is supplied to the external clock circuitry block 12, via lines 20. The external clock signal 19 is also supplied to multiplexer 16, via line 20b. Further, an internal clock signal 21 is supplied as an input to the internal clock circuitry block 14, as well as multiplexer 16, via lines 22.

Internal clock signal 21 is generated by an internal clock (not depicted) that runs continuously and is typically a crystal driven clock. External clock signal 19 is generated by an external clock (not depicted) and typically is the network clock. The circuitry 10 allows for asynchronous shifting between a first (internal) or second (external) clock signal, where both clocks are running at approximately the same frequency.

A carrier sense signal 23 is supplied directly to external clock circuitry block 12, via lines 24, and after inversion by inverter 26 is also supplied as an input to the internal clock circuitry block 14. The carrier sense signal 23 is used to determine when a shift between the two clock signals is desired or required.

The output of the internal clock circuitry block 14 may be a control signal on line 30a which is then supplied to multiplexer 16 to indicate that the internal clock signal 21 should be employed as the output clock signal 50. In addition, the signal on line 30a may also be provided as feedback to the external clock circuitry block 12, via line 30b. In a similar manner, the output from external clock circuitry block 12 may be a control signal on line 32 that indicates that the external clock signal 19 should be employed as the clock signal 50 in the exterior circuitry supported by the dynamic clock switching circuit 10.

As may be seen from FIG. 1, multiplexer 16 may consist of two pass gates 40 and 42 which are appropriately connected to either the external clock signal 19 or the internal clock signal 21 and whose pass gate "on" or "off" nature are controlled by an appropriate control signal, either the signal on line 30a or line 32 (which are in turn generated by their respective clock circuitry blocks). Depending upon which pass gate is activated, either the external clock signal 19 or the internal clock signal 21 is provided as the input signal to a resistive latch 44.

Resistive latch 44 is seen to consist of two serially connected inverters, with one inverter 48 being a "resistive" inverter so that its stored signal may be overcome by an input signal. The resistive inverter 48 feeds back its signal to a normal inverter 46. The resistive inverter 48 has a lower feedback than normal inverter 46 allowing its internal signal to be overridden by a different input signal. The output from this latch 44 is then the clock signal 50 that is used by the other exterior circuitry supported by the dynamic clock switching circuit 10. Other different circuitry may be employed as multiplexer 16 and still be within the scope of the present invention.

The operation of the circuitry in FIG. 1 is as follows. When a carrier sense "active" signal 23 is detected on line 24, this indicates that there should be a shift from the internal clock signal 21 (as the clock signal used by the circuitry exterior to the dynamic clock circuit 10) to the external clock signal 19. An internal delay line made up of delay blocks or delay latches is employed to prevent a switch from one clock (the "in use" clock) to the other clock "non-used" clock) until a preselected delay, of preferably two cycles of the incoming or non-used clock signal, has been measured in the appropriate clock circuitry block, 12 or 14 and to ensure the in use clock signal goes "low" before the switch. This ensures that the clock signals are switched in a "low" phase or slave clock position rather than a "high" phase position and that any synchronization differences between the two synchronizer blocks of the two clock blocks 12, 14 can be accommodated. By switching in a low position, there can be no "short" clock pulses due to overlapping clock signals which might damage the exterior circuitry.

The detection of the carrier sense "active" signal 23 by the external clock circuitry block 12 occurs, and after an appropriate preselected delay, this detection in turn causes the control signal on line 32 to cause pass gate 40 to then pass the external clock signals 19 on to latch 44, and accordingly, on to the external circuitry. In the absence of any carrier sense signal 23, the internal clock circuitry block 14 will supply a control signal on line 30a to its respective pass gate 42 which then allows the internal clock signal 21 to be the signal employed by the external circuitry. When the carrier sense "active" signal 23 goes low, then the external clock signal 19 is replaced by the internal clock signal 21 after an appropriate preselected delay. Internal clock circuitry block 14 also supplies feedback via line 30b to the external clock circuitry block 12. The feedback line 30b serves as an override signal and clears any data in the delay blocks of the external clock block delay line, when there is no external clock signal, to prevent shifting out possible erroneous clock phases when the external clock signal starts again.

In addition, if the carrier sense signal 23 changes rapidly so that the logic of the two clock blocks 12, 14 think the other clock is incoming, it is possible, because of the delays to have no output clock signal 50. This is undesirable for CMOS, as long periods without clocks may cause latch-up. Accordingly, the circuitry of the present invention will detect this and provide the internal clock signal 21 as the output clock signal 50 on a once every other clock cycle basis. Thus, a reduced clock is provided even for this potentially troublesome case.

Figure 2:
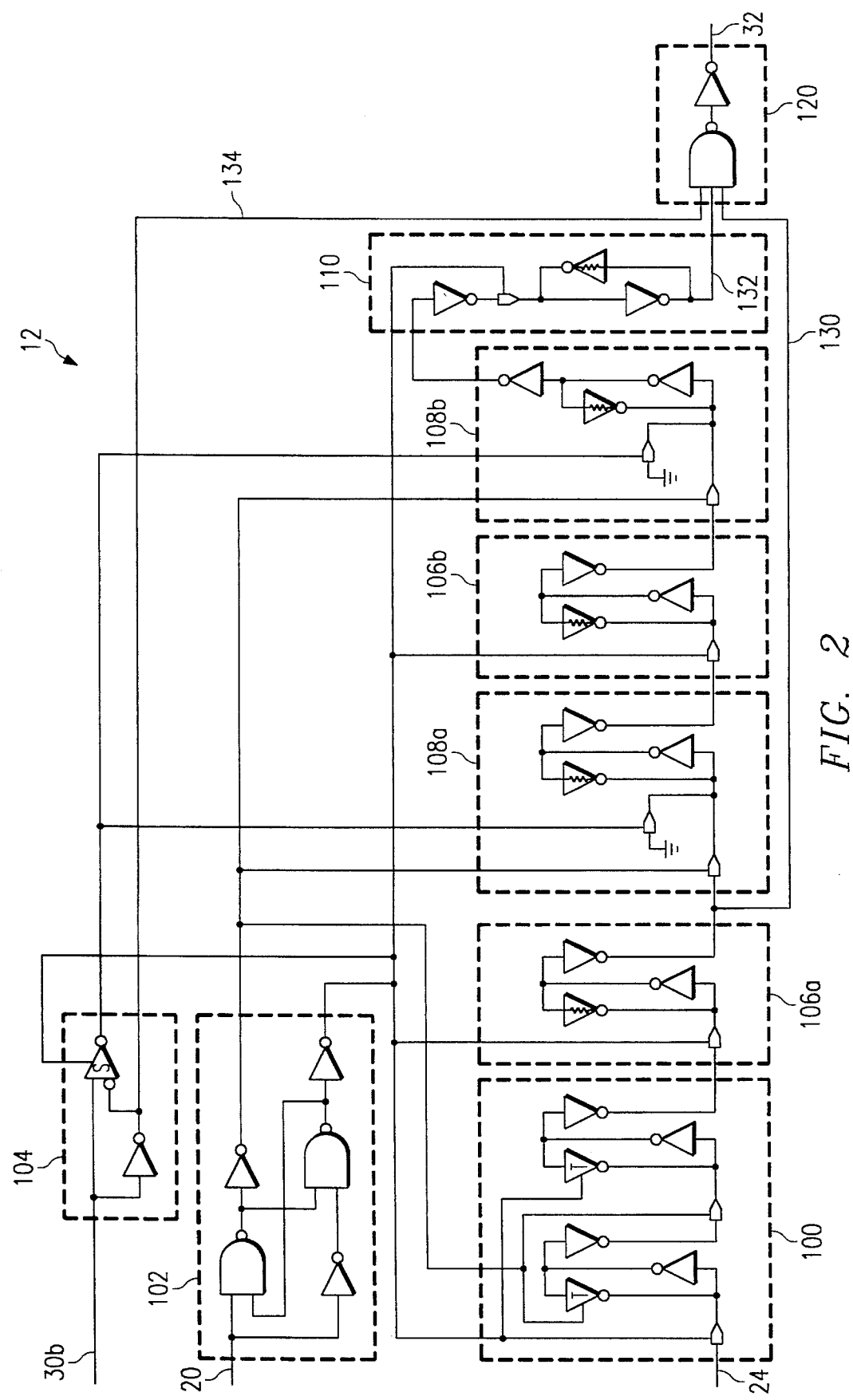
FIG. 2 depicts a simplified block diagram of the external clock block of FIG. 1.

Referring now to FIG. 2 there may be seen a simplified block diagram of the main elements (outlined in dashed lines) of the external clock circuitry block 12 of FIG. 1 and specific circuits to implement them. More particularly, it may be seen that the carrier sense signal 23 is supplied to a synchronization circuit or block 100, via line 24. In addition, it may also be seen that the external clock signal 19 is supplied to a local clock generator circuit or block 102, via line 20. A control signal or feedback signal from the interior clock circuitry block 14 on line 30b also supplies an appropriate signal to a feedback logic circuit or block 104.

The local clock generator circuit 102 is employed to convert the external clock signals 19 into local two-phase, non-overlapping clock signals that are synchronized with the external clock signal 19. The local clock generator circuit 102 supplies these local clock signals to various delay blocks or delay latches 106, 108, 110 that make up the internal delay line. The circuitry depicted in block 102 employs two cross-connected stages of NAND gates and inverters and a single inverter for the input of the second stage, and is the presently preferred circuitry to implement this function. Clearly, other circuitry may be so employed and be within the scope of the present invention.

The carrier sense signal 23 is supplied to a synchronizing block 100 where the detection of a change in the carrier sense signal 23 is synchronized with one phase of the local clock signal generated by the local clock generator circuit 102. The synchronizing block 100 depicted in FIG. 2 employs two stages, with each stage having an input pass gate, two serially coupled inverters (with one inverter being gated) and an output inverter. Clearly, other circuitry may be so employed and be within the scope of the present invention. An output of the synchronization block 100 is then passed through a delay line, having a preselected amount of delay, made up of several serially connected individual delay blocks or delay latches 106, 108, 110.

Each delay block 106a, 108a, 106b, 108b, 110 (each delay block is outlined in dashed lines) is typically a pass gate and two inverters serially coupled to form a "resistive" latch and typically having a single inverter as the final stage. However, delay block 110 has its single inverter as its first stage. The input signal for each one of these delay latches or delay blocks 106, 108, is appropriately controlled by its input pass gate which receives its "pass" signal from the local clock generator circuit 102. This ensures positive control over the delay latches by the local clock generator circuit 102.

After a first optional delay latch or delay block 106a, an output signal 130 is picked off and supplied to a logic block 120 as seen in FIG. 2. (130 is used to denote this signal as well as the line on which it is found.) This first delay block 106a ensures the sense of the "use external clock" signal is such that it may be used by other exterior logic (i.e. it is positive-going when the carrier sense signal is positive-going) and may be omitted if there is no such logic (or the signal is not used externally). It may also be seen that two of the delay or latch blocks 108a, b also have an additional signal which is a ground or "null" signal, which is also controlled by a second parallel input pass gate; these second input pass gates in turn are controlled by a feedback control signal from the internal clock circuitry block 14, via block 104, which is also clocked by the local clock generator circuit 102. In this manner, when the internal clock signal 21 is being employed as the output clock signal 50 and no external clock signal is present, a control signal is present on line 30b and these second pass gates are "enabled" to ensure that the latches 108a, b are nulled or zeroed. This avoids problems with "ones" left in the delay latches of the delay line (by an external clock signal stopping before the carrier sense active signal stops) being inadvertently shifted out when the external clock signal 19 starts up again.

After the first latch or delay block 106a, there are then four additional serially connected delay or latch blocks 108a, 106b, 108b, 110 which then provide for a preselected delay of preferably four local clock phases (or two clock cycles) of delay before an output signal 132 is supplied to the logic circuit 120. (132 is used to denote this signal as well as the line on which it is found.) Other preselected delays may be employed and/or other circuitry may be employed for the delay line and still be within the scope of the present invention. An additional output signal 134 supplied to the logic circuit 120 is derived from the control signal from the internal clock circuitry 14 by logic block 104. (Again, 134 is used to denote this signal as well as the line on which it is found.) Depending upon the signals presented to logic block 120, an appropriate "use external clock" control signal is then generated or derived and supplied to line 32 to provide the external clock signal 19 as the output clock signal 50 for the exterior circuitry.

Figure 3:
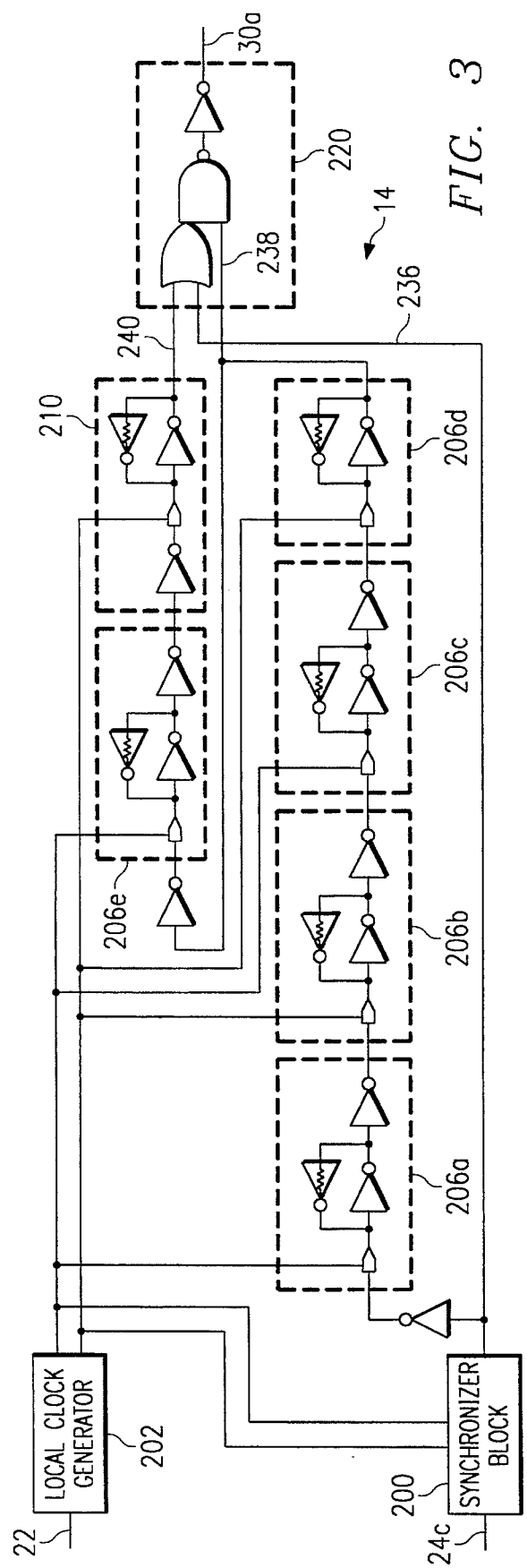
FIG. 3 depicts a simplified block diagram of the internal clock block of FIG. 1.

Referring now to FIG. 3, there may be seen a simplified block diagram of the internal clock circuitry block 14. More particularly, it may be seen that the internal clock signal 21 is supplied by line 22 to a local clock generator circuit or block 202, which contains the same circuitry as block 102 of FIG. 2 and performs the same function. In addition, in a manner similar to FIG. 2, the carrier sense signal on line 24c, or for block 14, the inverse of the carrier sense signal, is synchronized with the local clock phases from local clock generator circuit 202 by a synchronizer circuit or block 200. Synchronizer block 200 contains the same circuitry as block 100 of FIG. 2 and performs the same function.

An output signal of the synchronizer block 200 is fed immediately to a logic block 220, via line 236, as a first output signal. (236 is used to denote the line as well as the signal found thereon.) This logic block 220 then determines whether to provide a control signal on line 30a to require the use of the internal clock signal 21 as the output clock signal 50. In addition, the output of the synchronizer block 200 is fed to an internal delay line, having a preselected amount of delay, made up of a series of delay or latch blocks 206a–e, 210 which are appropriately controlled by the phases from the local clock generator circuit 202.

Continuing to refer to FIG. 3, it may be seen that there are four such serially connected delay blocks 206a–d the output 238 of which serves as a second output signal to the logic block 220; the second output signal 238 is provided after a preselected delay of two local clock cycles (measured from the synchronizer output signal going high) for use in determining whether or not to generate the "use internal clock" control signal on line 30a. (Again, 238 is used to denote the signal as well as the line on which it is found.) A different amount of delay, and correspondingly a different number of delay blocks, may be employed and still be within the scope of the present invention.

Following these four blocks, there are an additional two delay blocks 206e, 210 which then supply a third output signal 240 after one local clock cycle to the logic block 220 to enable the logic block 220 to appropriately determine the need to generate the "use internal clock" control signal on line 30a. (Again, 240 is used to denote the signal as well as the line on which it is found.)

As may be seen from FIG. 3, logic block 220 evaluates these three output signals 236, 238, and 240 to determine if a "use internal clock" control signal is to be generated. More particularly, logic block 220 uses the synchronizer 200 output signal on line 236 to determine if the carrier sense signal 23 is present. If the carrier sense signal 23 is active, then the synchronizer 200 output goes low and, (for discussion purposes ignoring the third output 240) logic block 220 causes its control signal on line 30a to go low to remove the internal clock signal 21 as the exterior clock signal 50 after the internal clock signal 21 has gone "low". That is, in general, if the carrier sense signal 23 goes active then the synchronizer 200 output goes low, as does the "use internal clock" control signal, and the internal clock signal 21 is no longer used as the output clock signal 50, after the signal 21 goes low.

Once the carrier signal 23 goes inactive, the synchronizer 200 output goes high and after four local clock phases of delay (or some other preselected amount of delay) the second output 238 is provided and the "use internal clock" control signal is generated to cause the internal clock signal 21 to be used. However, to avoid the loss of clock signal 50 due to a rapidly changing carrier sense signal 23, additional logic and circuitry must be added. This additional circuitry is the additional two delay blocks 206e, 210 and the single inverter between block 206d and block 206e. The additional logic ensures that the internal clock signal 21 has previously been used for at least one cycle (the two local clock phases of delay) (or gone "high") or the synchronizer 200 output signal is ignored.

This additional logic is implemented by the use of the third output signal 240 in FIG. 3. The third output signal 240 from the two phase delay line serves to generate the "use internal clock" control signal to turn "on" the internal clock signal 21 for one phase when the synchronizer 200 turns off and the four delay line output 238 did not previously (one clock cycle earlier) indicate that the internal clock should be used. The sense of the third output 240 is reversed from the sense of the first and second outputs 236 and 238 because of the extra inverter before the two delay latches 206e, 210.

Again, different circuitry or combinations of circuit elements may be employed for the delay lines and/or delay blocks and/or different preselected delays may be employed and still be within the scope of the present invention.

Figure 4:
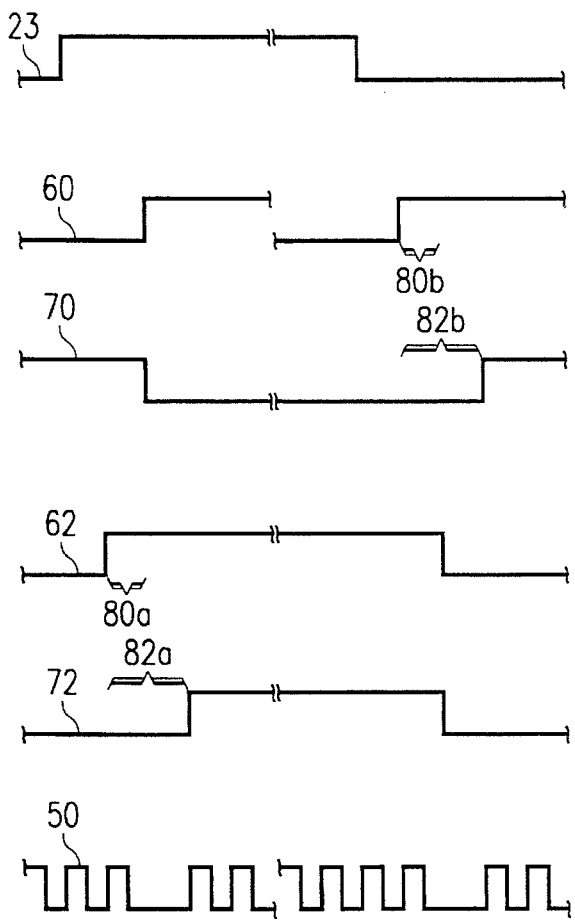
FIG. 4 depicts simplified timing diagrams of various signals employed by the circuitry of FIG. 1.

Referring now to FIG. 4, there may be seen simplified timing diagrams of various signals employed by the circuitry of the present invention. More particularly, it may be seen that there are representations of a carrier sense signal 23, a synchronizer 200 output signal 60 of the internal clock block 14, a "use internal clock" control signal 70 from internal clock block 14, a synchronizer 100 output signal 62 of the external clock block 12, a "use external clock" control signal 72 from external clock block 12, and the final output clock signal 50.

Continuing to refer to FIG. 4, it may be seen that when the carrier sense signal 23 goes "active" or "high", this change is detected by the synchronizing circuits 100, 200 in the two clock blocks 12 and 14. This change indicates a need to use the external clock signal 19 rather than the internal clock signal 21 for the exterior circuitry. Normally, both synchronizers 100, 200 detect the change and synchronize it based upon their respective local clock signals (which are based upon the internal or external clock signal). As the two clocks are asynchronous, the synchronizers 100, 200 will normally provide output signals 60, 62 at different times, as depicted in FIG. 4. The signals may differ by up to one clock cycle or period. The worst case difference of one clock cycle is caused when the two clocks (internal and external) are almost synchronous and the input carrier sense signal 23 changes just as the synchronizer sample time finishes. In such circumstances, the two synchronizers 100, 200 may resolve the change in the carrier sense signal 23 differently and hence their outputs 60, 62 differ by a cycle. This is represented by the bracket 80a on signal 62 (left side of FIG. 4) and the bracket 80b on signal 60 (right side of FIG. 4).

When the carrier sense signal 23 goes high (left side of FIG. 4), the output 60 of the synchronizer 200 of the internal clock block 14 causes the "use internal clock" control signal 70 to immediately go low, causing the internal clock signal 21 to drop out (after it goes low) as the output clock signal 50. The output 62 of the synchronizer 100 of the external clock block 12 causes the "use external clock" control signal 72 to go "high" or "active" after a preselected delay of preferably two clock cycles (or four phases) of the local external clock signal 19; this causes the external clock signal 19 to become the output clock signal 50. The bracket 82a on signal 72 represents this delay. One additional local external clock phase of delay may be added before the four phases of delay to allow use of the "use external clock" control signal 72 in other system logic, and accordingly is optional.

As may also be seen from FIG. 4, when the carrier sense signal 23 goes low (right side of FIG. 4), the reverse effect occurs. That is, the synchronizers 100, 200 provide their "outputs", the external clock drops out after it goes low, and after a preselected delay of preferably two cycles of the local internal clock (bracket 82b), the internal clock signal 21 becomes the output clock signal 50.

As may also be seen from FIG. 4, for both cases, the output clock signal 50 goes "low" and stays low for up to three phases before the incoming or non-used clock signal becomes the output clock signal 50. This ensures a zero or "low" at switch over, for the reasons noted earlier herein. A "low" delay of at least three phases allows for a margin of frequency error between the internal and external clocks of up to fifty percent (50%).

The circuitry 10 of the present invention is designed to work with any of the different types of carrier sense circuits/ systems used with computer networks and accordingly is able to accommodate external clock signals 19 that start before or with a carrier sense "active" or "high" signal 23, and stop with or after the transition of the carrier sense signal 23 from "high" to "low".

Thus, it may be seen that the present invention provides circuitry for switching between a first and second clock signal having a first local clock circuit for generating a first local clock signal based upon the first clock signal, a first synchronizing circuit connected to the first clock circuit for synchronizing detection of a first control signal with the first local clock signal and generating a first output signal, a first delay circuit connected to the first synchronizing circuit and the first clock circuit for providing a second output signal two cycles of the first local clock signal after detection of loss of the first control signal, a second delay circuit connected to the first delay circuit and the first clock circuit for providing a third output signal after detection of no previous use of the first clock signal, a first logic circuit connected to the first and second delay circuits and the first synchronizing circuit for generating a second control signal responsive to preselected combinations of the first, second, and third output signals, a second local clock circuit for generating a second local clock signal based upon the second clock signal, a second synchronizing circuit connected to the second clock circuit for synchronizing detection of the inverse of the first control signal with the second local clock signal and generating a fourth output signal, a third delay circuit connected to the second synchronizing circuit and the second clock circuit for providing a fifth output signal two cycles of the second local clock signal after the detection by the second synchronizing circuit, a second logic circuit connected to the second clock circuit and a portion of the third delay circuit responsive to the second control signal for generating a sixth output signal, and a third logic circuit connected to the third delay circuit and the second logic circuit for generating a third control signal responsive to preselected combinations of the fourth, fifth and sixth output signals. A multiplexer is connected to the first and third logic circuits for selecting the first or second clock signal responsive to the second or third control signal. Optionally, there may be a fourth delay circuit connected between the second synchronizing circuit and the third delay circuit and connected to the second clock circuit for providing the third output signal to the third logic circuit one phase of the second clock signal after the detection by the second synchronizing circuit.

Figure 5:
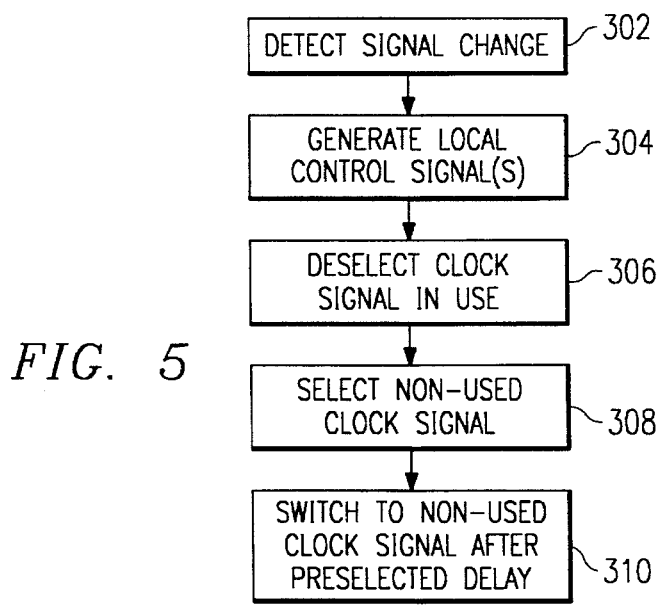
FIG. 5 depicts a simplified flow diagram of the main steps of a method of the present invention.

Referring now to FIG. 5 there may be seen a simplified flow diagram of the steps of the method of the present invention for dynamic switching between a first and second clock signal. More particularly, it may be seen that the method of the present invention initially detects a change in a signal 302 indicative of the need to switch from a first clock signal to a second clock signal. Upon detection of this change in the signal, at least one local control signal is generated 304. The clock signal in use is deselected 306 based upon a first local control signal. The other non-used clock is selected for use 308 in response to a second local control signal and then switching from the used clock signal to the non-used clock signal after a preselected delay 310, where the delay is based upon the non-used clock signal and starts upon the detection of a change in the signal.

Thus, it may be seen that the present invention provides a method for switching between a first and second clock signal by detecting a change in a signal indicative of need to switch from the first clock signal to the second clock signal (or vice versa), generating at least one local control signal responsive to the detection, deselecting a first clock signal in use responsive to a first local control signal, selecting the second (non-used) clock signal for use responsive to a second local control signal, and switching to the non-used (second) clock signal after a preselected delay based upon the second clock signal and the detection of the change in the signal.

Many other variations and modifications may be made in the techniques and apparatus hereinabove described, by those having expertise in this technology, without departing from the concepts of the present invention. Accordingly, it should be clearly understood that the methods and apparatus depicted in the accompanying drawings and referred to in the foregoing description are illustrative only and are not intended as limitations on the scope of the invention.

What is claimed is:

1. An apparatus for switching between a first clock signal and a second clock signal, said first clock signal continuously oscillating between a first digital state and a second digital state, said second clock signal intermittently oscillating between said first digital state and said second digital state, said first and second clock signals having approximately the same frequency and being asynchronous, said apparatus comprising:

a multiplexer having a first clock input receiving said first clock signal, a second clock input receiving said second clock signal, a first control input, a second control input and an output, said multiplexer coupling said first clock signal to said output upon receipt of a signal having said first digital state at said first control input and coupling said second clock signal to said output upon receipt of a signal having said first digital state at said second control input;

a first clock block having a first clock input receiving said first clock signal, a first control input receiving a first active signal having said second digital state when said second clock signal is oscillating and a first control output connected to said first control input of said multiplexer, said first clock block including a first delay circuit connected to said control input, said first delay circuit generating a first delay signal at said first digital state a first predetermined time after said first active signal received at said control input changes from said second digital state to said first digital state, a first clock block output circuit connected to said first clock input, said first control output and said first delay circuit, said first clock block output circuit generating a first control signal on said first control output having said first digital state when said first clock signal has said second state following generation of said first delay signal; and a second clock block having a second clock input receiving said second clock signal, a second control input receiving a second active signal having said first digital state when said second clock signal is oscillating and a second control output connected to said second control input of said multiplexer, said second clock block including a second delay circuit connected to said second control input and said second control output, said second delay circuit generating a signal on said second control output at said first digital state a second predetermined time after said second active signal received at said control input changes from said second digital state to said first digital state, a feedback logic circuit connected to said first control output of said first clock block latching said first control signal, a second clock block output circuit connected to said second clock input, said second control output, said second delay circuit and said feedback logic circuit, said second clock block output circuit generating an output on said second control output having said first digital state when 1) said second clock signal has said second state following generation of said first delay signal, and 2) said first control signal latched in said feedback logic circuit has said second state.

2. The apparatus of claim 1, wherein:
said first predetermined time is two clock cycles of said first clock signal.

3. The apparatus of claim 1, wherein:
said second predetermined time is two clock cycles of said second clock signal.

4. The apparatus of claim 1, wherein:
said first delay circuit includes
a first local clock generator connected to said first clock input generating a first in-phase local clock signal in phase with said first clock signal and a first out-of-phase local clock signal having a phase opposite to said first clock signal, and
a first chain of a plurality of delay latches connected to said first local clock generator forming a clocked delay line clocked by said first in-phase local clock signal and said first out-of-phase local clock signal.

5. The apparatus of claim 1, wherein:
said second delay circuit includes
a second local clock generator connected to said second clock input generating a second in-phase local clock signal in phase with said second clock signal and a second out-of-phase local clock signal having a phase opposite to said second clock signal, and
a second chain of a plurality of delay latches connected to said feedback logic circuit and said second local clock generator, said second chain of a plurality of delay latches forming a clocked delay line clocked by said second in-phase local clock signal and said second out-of-phase local clock signal, each latch of said second chain of a plurality of delay latches cleared to a predetermined state when said first control signal latched in said feedback logic circuit has said first state.

6. The apparatus of claim 1, wherein:
said first clock block further includes
a third delay circuit connected to said first delay circuit generating a third delay signal at said first digital state a third predetermined time after said first delay signal changes from said second digital state to said first digital state, and
said first clock block output circuit is further connected to said third delay circuit, said first clock block output circuit generating said first control signal on said first control output having said second digital state only after said third delay signal has been received following said first active signal having said second digital state.

7. A method for switching between a first clock signal continuously oscillating between a first digital state and a second digital state, and a second clock signal intermittently oscillating between said first digital state and said second digital state based upon a control signal having a first digital state when said second clock signal is oscillating, said first and second clock signals having approximately the same frequency and being asynchronous, said method comprising the steps of:

deselecting said first clock signal a first predetermined time following said control signal changing from said first digital state to said second digital state;

selecting said second clock signal during a next interval when said second clock signal is in said second digital state following a second predetermined time after said control signal changes from said first digital state to said second digital state;

deselecting said second clock signal said second predetermined time following said control signal changing from said second digital state to said first digital state;

selecting said first clock signal during a next interval when said first clock signal is in said second digital state following said first predetermined time after said control signal changes from said second digital state to said first digital state.

8. The method of claim 7, wherein:

said step of deselecting said first clock signal further includes continuing to select said first clock signal unit said first clock signal has been selected for at least a third predetermined time.

* * * * *